United States Patent
Zhu (10) Patent No.: US 8,594,502 B2
(45) Date of Patent: Nov. 26, 2013

(54) METHOD AND APPARATUS USING DISTRIBUTED RAMAN AMPLIFICATION AND REMOTE PUMPING IN BIDIRECTIONAL OPTICAL COMMUNICATION NETWORKS

(75) Inventor: Benyuan Zhu, Princeton, NJ (US)

(73) Assignee: OFS Fitel, LLC, Norcross, GA (US)

( * ) Notice: Subject to any disclaimer, the term of this patent is extended or adjusted under 35 U.S.C. 154(b) by 589 days.

(21) Appl. No.: 12/727,685

(22) Filed: Mar. 19, 2010

(65) Prior Publication Data

US 2010/0266284 A1   Oct. 21, 2010

Related U.S. Application Data

(60) Provisional application No. 61/169,510, filed on Apr. 15, 2009.

(51) Int. Cl.
*H04J 14/00* (2006.01)
*H04B 10/00* (2013.01)

(52) U.S. Cl.
USPC ............................................ 398/67; 398/157

(58) Field of Classification Search
USPC .............................. 398/66, 67, 157
See application file for complete search history.

(56) References Cited

U.S. PATENT DOCUMENTS

| | | | |
|---|---|---|---|
| 5,323,404 A | 6/1994 | Grubb | 372/6 |
| 6,163,636 A | 12/2000 | Stentz | 385/24 |
| 6,344,922 B1 * | 2/2002 | Grubb et al. | 359/334 |
| 6,504,973 B1 | 1/2003 | DiGiovanni et al. | 385/27 |
| 2002/0044339 A1 * | 4/2002 | Chesnoy et al. | 359/337 |
| 2002/0080833 A1 * | 6/2002 | Matsuura et al. | 372/20 |

(Continued)

FOREIGN PATENT DOCUMENTS

| | | | | |
|---|---|---|---|---|
| WO | WO 2007 005466 | 1/2007 | | H01S 3/30 |
| WO | WO 2007/123361 | * 11/2007 | | G02B 6/42 |

OTHER PUBLICATIONS

K. L. Lee et al., "Extended—Reach Gigabit Passive Optical Network . . . ," *National Fiber Optic Engineers Conference*, OSA Technical Digest, Paper NME3 (Mar. 22-26, 2009).

(Continued)

*Primary Examiner* — Nathan Curs
(74) *Attorney, Agent, or Firm* — Michael J. Urbano, Esq.

(57) ABSTRACT

A bidirectional optical communications network comprises an optical transmission fiber for carrying a downstream signal at a first wavelength and a multiplicity of upstream signals at a second, different wavelength. The fiber is characterized by distributed Raman gain over at least an extended portion of its length. A first terminal, optically coupled to one end of the fiber, includes a first transmitter for generating the downstream signal, a first receiver for detecting the upstream signals, and at least one pump source for generating pump light that provides Raman amplification to either the downstream signal or the upstream signal or both. A multiplicity of second terminals, optically coupled to another end of the fiber, each includes a second transmitter for generating one of the upstream signals, and a second receiver for detecting a downstream sub-signal. A passive optical node is configured to (i) split the downstream signal into a multiplicity of downstream sub-signals each propagating at the first wavelength to a separate one of the second terminals and (ii) to combine each of the upstream signals from each of the second terminals onto the fiber for transmission to the first terminal. In another embodiment, the network is a GPON compatible with current ITU standards.

20 Claims, 5 Drawing Sheets

(56) References Cited

U.S. PATENT DOCUMENTS

| | | | |
|---|---|---|---|
| 2002/0159694 A1 | 10/2002 | Yano | 385/33 |
| 2007/0014574 A1 | 1/2007 | Yada | 398/71 |
| 2007/0172239 A1* | 7/2007 | Yamazaki et al. | 398/68 |
| 2007/0183779 A1 | 8/2007 | Bouda et al. | 398/72 |
| 2008/0089686 A1 | 4/2008 | Kazawa et al. | 398/71 |
| 2009/0052897 A1* | 2/2009 | Kazawa et al. | 398/71 |
| 2010/0040364 A1* | 2/2010 | Jenkins et al. | 398/26 |

OTHER PUBLICATIONS

K-I Suzuki et al., "Amplified gigabit PON systems," *J. Opt. Networking*, Vo. 6, No. 5, pp. 422-433 (May 2007).

P. P. Iannone et al., "Hybrid CWDM Amplifier Shared . . . ," *Proc. OFC 2007*, PDP-13 (2007).

P. B. Hansen et al., "Capacity Upgrades of Transmission Systems . . . ," *IEEE Photonics. Tech. Lett.*, vol. 9, No. 2, pp. 262-264 (Feb. 1997).

M. N. Islam, "Raman Amplifiers for Telecommunications 2," Springer-Verlag, New York (2004); Ch. 1, pp. 1-33; Ch. 11, pp. 354-357; Ch. 19, pp. 673-721.

B. Zhu, et al., "GPON reach extension to 60 km with entirely passive fibre plant using Raman amplification," *ECOC 2009*, paper 8.5.5 (Sep. 2009).

"Passive optical network," *Wikipedia*, pp. 1-7, available online at www.wikipedia.org (Jan. 2010).

"Raman Amplifiers," *Encyclopedia of Laser Physics and Technology*, pp. 1-3, available online at www.rp-photonics.com (Jul. 2009).

"Raman Amplification," *Wikipedia*, p. 1, available online at www.wikipedia.org (Jul. 2009).

P. Hansen, "Remote optical amplification extends transmission spans," *Laser Focus World*, vol. 34, No. 4, pp. 79-88 (1998).

\* cited by examiner

METHOD AND APPARATUS USING DISTRIBUTED RAMAN AMPLIFICATION AND REMOTE PUMPING IN BIDIRECTIONAL OPTICAL COMMUNICATION NETWORKS

CROSS-REFERENCE TO RELATED APPLICATIONS

This application claims priority from Provisional Application Ser. No. 61/169,510 filed on Apr. 15, 2009 and entitled "Method and Apparatus for Remotely-Pumped Passive Optical Network System for Extending Reach."

BACKGROUND OF THE INVENTION

1. Field of the Invention

This invention relates to optical fiber communication networks, and, more particularly, to method and apparatus using distributed Raman amplification and remote pumping for extending the reach and/or increasing the split ratio of passive optical networks.

2. Discussion of the Related Art

Figure 1:
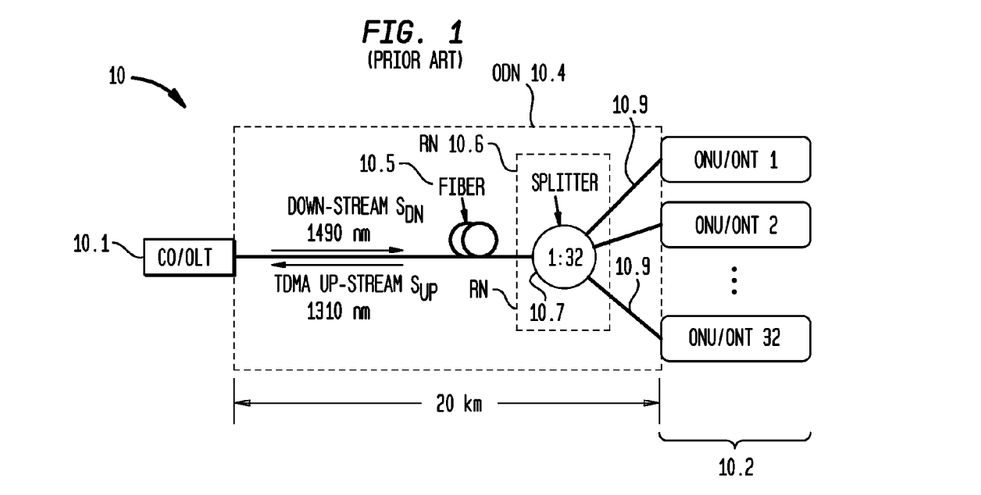
FIG. 1 is a schematic, block diagram of a typical conventional PON.

A passive optical network (PON) is a point-to-multipoint, fiber-to-the-premises, broadband network architecture in which unpowered optical splitters are used to enable a single optical fiber to serve multiple customer premises. As shown in FIG. 1, a typical PON 10 includes an optical line terminal (OLT) 10.1 at the service provider's central office (CO) and a multiplicity of optical network units or terminals (ONUs or ONTs) 10.2 located at or in the vicinity of near end users; i.e., subscriber or customer premises (CPs; not shown). The OLT 10.1 is optically coupled to the ONU/ONTs via an optical distribution network (ODN) 10.4 comprising a transmission optical fiber 10.5 and a 1:N passive optical splitter 10.7 located within a remote node (RN) 10.6. The ODN is often referred to as the outside plant.

A PON is said to be passive even though it is apparent that the terminals (OLTs, ONUs and ONTs) of the network include active components and/or circuits that require electrical power. Nevertheless, as long as the ODN includes no components or circuits that require electrical power, it is common in the industry to refer to the entire PON as being passive.

The number of ONU/ONTs corresponds to the split ratio (1:N) of splitter 10.7. Each ONU/ONT 10.2 terminates the optical fiber transmission line and provides electrical signals over metallic lines to each CP.

A single fiber architecture between the OLT and splitter is made possible by using wavelength division multiplexing (WDM); e.g., in a GPON (gigabit PON) standardized with ITU-T G.984. The downstream signals are transmitted at a wavelength in the range of 1480-1500 nm and upstream signals are transmitted at a wavelength in the range of 1300-1320 nm. Continuous-mode downstream signals (e.g., 1490 nm signals from the OLT to the ONU/ONTs) are broadcast to each ONU/ONT 10.2 sharing the single fiber 10.5; that is, a downstream signal is split into a multiplicity of sub-signals that are directed onto separate optical fiber paths coupled to different ONU/ONTs. (The sub-signals at the output of the splitter are essentially identical to the downstream signal as received at the input of the RN but have lower power due to the inherent function of the splitter.) Encryption is used to prevent eavesdropping. On the other hand, burst-mode upstream signals (e.g., 1310 nm signals from the ONU/ONT 10.2 to the OLT 10.1) are combined using multiple access protocol, usually time division multiple access (TDMA). The OLTs control the transmission of the traffic from the individual ONU/ONTs onto the shared single fiber in order to provide time slot assignments for upstream communication.

PONs do not use electrically powered components to split the downstream signal. Instead, the signal is distributed among end users by means of passive optical splitters. Each splitter typically splits the signal from the transmission fiber 10.5 into N drop-line (or fan-out) fibers 10.9, where N depends on the manufacturer, and several splitters can be aggregated in a single remote node cabinet.

PON configurations reduce the amount of fiber and CO equipment needed compared with point-to-point architectures. In addition, a PON requires little maintenance and no electrical powering in the passive outside plant (ODN), thereby reducing expense for network operators. However, the maximum transmission distance (or reach) between the OLT and the farthest ONU/ONT, as well as the split ratio, are currently limited by various physical layer limitations and the PON protocol. For example, although the GPON standard (ITU-T G.984) allows for a logical reach of 60 km and maximum split ratio of 1:128, a 28 dB loss budget currently limits typical GPON deployments to a 1:32 split ratio and km reach. Of course, for a given loss budget, if a particular application allows for a smaller split ratio (e.g., 1:16), then the reach may be longer (e.g., 30 km). Conversely, if an application allows for a shorter reach (e.g., 10 km), then the split ratio may be larger (e.g., 1:64). However, some applications require both: a longer reach (e.g., 60 km) and a larger split ratio (e.g., 1:64).

There have been several reports of techniques to extend the reach of PON systems [e.g., K. Suzuki, et al., "Amplified gigabit PON systems", *J. Optical Networking*, Vol. 6, No. 5, pp. 422-433 (2007); and P. P. Iannone, et al., "Hybrid CWDM Amplifier Shared by Multiple TDM PONs", Proceeding of OFC 2007, PDP-13 (2007), which are incorporated herein by reference]. In addition, GPON reach extenders have been standardized recently by the International Telecommunications Union. [See, ITU-T G.984.6.]

The reach extension approaches considered in G.984.6 require the use of electrically powered units in the outside plant containing well-known optical amplifiers or optical-to-electrical-to-optical (OEO) repeaters, but this design requirement negates some of the advantages of PON systems and may not always be practical or cost effective for network service providers/operators, particularly in certain environments where no electrical powering is available.

Thus, a need remains for techniques that extend the reach and/or increase the split ratio of PONs while maintaining a passive outside plant.

There is also a need for increasing the loss budget of PONs without requiring electrical powering in the distribution network of such a system.

BRIEF SUMMARY OF THE INVENTION

In accordance with a first aspect of my invention, I propose to use remote pumping and distributed Raman amplification at the upstream optical signal wavelength and/or at the downstream optical signal wavelength of a PON to improve its loss budget, thereby extending its reach and/or increasing its split ratio.

In accordance with one embodiment of the first aspect of my invention, a bidirectional optical fiber communications network comprises an optical transmission fiber for carrying a downstream optical signal at a first wavelength and a multiplicity of upstream optical signals at a second, different wavelength. The fiber is characterized by distributed Raman gain over at least an extended portion of its length. A first terminal, optically coupled to one end of the fiber, includes a first transmitter for generating the downstream signal, a first receiver for detecting the upstream signals, and at least one pump source for generating pump light that provides Raman amplification to either the downstream signal, or the upstream signals, or both. A multiplicity of second terminals, optically coupled to another end of the fiber, each includes a second transmitter for generating one of the upstream signals and a second receiver for detecting a downstream sub-signal. A passive optical node is configured (i) to split the downstream signal into a multiplicity of sub-signals, wherein each sub-signal propagates downstream to a separate one of the second terminals and (ii) to combine each of the upstream signals from each of the second terminals onto the fiber for transmission to the first terminal. Each downstream sub-signal at the output of the node is essentially identical to the downstream signal at the input to the node but of lower power due to the inherent function of the splitter.

In one embodiment of the first aspect of my invention, the optical communication network is compatible with current international or. industry PON standards, such as the requirements of ITU-T G.984 for GPONs or of IEEE 802.3ah for Ethernet PONs (EPONs).

In another embodiment of the first aspect of my invention, the at least one source includes a first source for generating pump light that counter-propagates with and provides Raman amplification to the upstream signals. In yet another embodiment of the first aspect of my invention, the at least one source also includes a second pump source for generating pump light that co-propagates with and provides Raman amplification to the downstream signal.

In still another embodiment of the first aspect of my invention, the passive optical node includes a wavelength-sensitive device that prevents any significant amount of the pump light from entering the receivers of the second terminals. In one configuration of this embodiment, the wavelength sensitive device comprises a bandpass filter; in another configuration, it comprises a reflector, which reflects pump light back into the fiber (after it has propagated through the fiber), thereby also providing additional Raman amplification of the signals.

A second aspect of my invention is a first terminal for use in the above-described bidirectional optical fiber communications network. The first terminal is coupled to an upstream end of the fiber and comprises a first transmitter for generating the downstream signal, a first receiver for detecting the upstream signals, and at least one pump source for generating pump light that provides Raman amplification to either the downstream signal, or the upstream signal, or both. In one embodiment of the second aspect of my invention, the at least one source includes a first source for generating pump light that counter-propagates with and provides Raman amplification to the upstream signals. In yet another embodiment of the second aspect of my invention, the at least one source also includes a second pump source for generating pump light that co-propagates with and provides Raman amplification to the downstream signal.

A third aspect of my invention is a passive optical node for use in the above-described bidirectional optical fiber communications network. The node is configured (i) to split the downstream signal into a multiplicity of downstream sub-signals, wherein each sub-signal propagates downstream at the first wavelength to a separate one of the second terminals and (ii) to combine each of the upstream signals from each of the second terminals onto the fiber for transmission to the first terminal. Each downstream sub-signal at the output of the node is essentially identical to the downstream signal at the input to the node but of lower power due to the inherent function of the splitter.

In one embodiment of the third aspect of my invention, the node includes a wavelength-sensitive device that prevents any significant amount of the pump light from entering the receivers of the second terminals. In one configuration of this embodiment, the wavelength sensitive device comprises a bandpass filter; in another configuration, it comprises a reflector configured to reflect pump light back into the fiber (after it has propagated through the fiber), thereby to also provide additional Raman amplification of the first and second signals.

A fourth aspect of my invention is a method of extending the reach, or increasing the split ratio, or both, of a bidirectional optical communication network including a first terminal coupled to one end of an optical transmission fiber that exhibits distributed Raman gain over at least an extended portion of its length and a multiplicity of second terminals coupled to another end of the fiber. The method comprises the steps of:

(a) generating at the first terminal a downstream optical signal at a first wavelength, (b) detecting at the first terminal upstream optical signals at a second wavelength, (c) generating pump light that provides Raman amplification to either the downstream signal, or the upstream signals, or both, (d) generating at the second terminals the upstream signals at the second wavelength, (e) detecting at the second terminals the downstream signal, and (f) passively (i) splitting the downstream signal into a multiplicity of downstream sub-signals each propagating at the first wavelength to a separate one of the second terminals and (ii) combining each of the upstream signals from each of the second terminals onto the fiber for transmission to the first terminal.

In one embodiment of the fourth aspect of my invention, step (c) generates pump light that counter-propagates with and provides Raman amplification to the upstream signals. In another embodiment of the fourth aspect of my invention, step (c) also generates pump light that co-propagates with and provides Raman amplification to the downstream signal.

In yet one more embodiment of the fourth aspect of my invention, the method also includes the step of, after the pump light propagates downstream through the fiber, reflecting it back upstream through the fiber to provide additional Raman amplification of the signal that was amplified in step (c).

BRIEF DESCRIPTION OF THE SEVERAL VIEWS OF THE DRAWING

My invention, together with its various features and advantages, can be readily understood from the following more detailed description taken in conjunction with the accompanying drawing, in which:

FIG. 3($a$) shows the propagation directions of the signals ($S_{DN}$, $S_{UP}$) and pump light ($P_{CO}$, $P_{CNTR}$) in the transmission fiber 20.5 between the CO/OLT 20.1 and the splitter 20.61; and FIG. 3($b$) illustrates how signal power evolves over the length of the fiber 20.5 for two cases: (i) with Raman amplification and (ii) without Raman amplification.

Throughout this discussion references made to wavelength are intended to mean the center wavelength of a particular light emission (e.g., optical signal or pump light), it being understood that all such emissions have a characteristic linewidth that includes a well-known range of wavelengths above and below the center wavelength.

DETAILED DESCRIPTION OF THE INVENTION

Bidirectional Optical Communications Network

Figure 2:
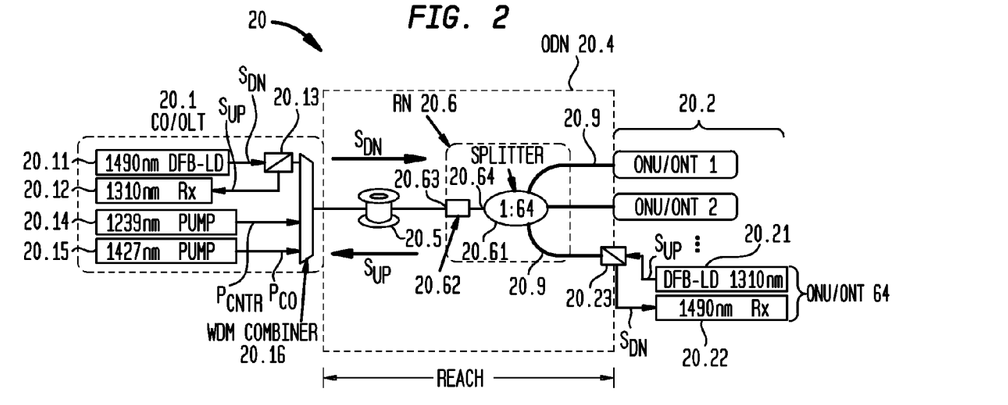
FIG. 2 is a schematic, block diagram of a PON in accordance with an illustrative embodiment of my invention.

Turning now to FIG. 2, a point-to-multipoint optical fiber communications network 20 comprises a first terminal 20.1 optically coupled to a multiplicity N of second terminals 20.2 via an ODN 20.4. The ODN includes an optical transmission fiber 20.5, a RN 20.6, and a multiplicity N of drop-line (or fan-out) fibers 20.9. A 1:N optical splitter 20.61, which includes only passive devices, is located in RN 20.6. In a PON environment, the first terminal 20.1 is an OLT located in a CO, and the second terminals are ONU/ONTs located at CPs or in neighborhood equipment cabinets (not shown) depending on the access network architecture.

The number of OLTs located in a particular CO depends on the number of CPs to be served. Only one OLT is shown in FIG. 2 for simplicity, but in COs containing multiple OLTs, the network would include multiple transmission fibers, and each OLT would be coupled to a separate one of the fibers. Each OLT 20.1 includes a transmitter 20.11 for sending downstream optical signals $S_{DN}$ to the ONU/ONTs and a receiver 20.12 for detecting upstream optical signals $S_{UP}$ from the ONU/ONTs 20.2. Splitter 20.61 splits the downstream signal into N sub-signals each coupled to a separate ONU/ONT via a separate drop-line or fan-out fiber 20.9. Each sub-signal at the output of the RN is essentially identical to the downstream signal at the input to the RN but of lower power due to the inherent function of the splitter. Typically, the downstream signals are digital signals transmitted in a continuous mode.

On the other hand, the number of ONU/ONTs 20.2 served per OLT 20.1, depends on the power budget of the network and the split ratio (1:N) of splitter 20.61. These factors also determine how far away the ONU/ONTs can be located from the CO; that is, the network reach. (Since all of the ONU/ONTs are typically not at the same distance from the OLT, reach refers to the ONU/ONT that is farthest from the OLT.) Each ONU/ONT 20.2 also includes a transmitter 20.21 for sending upstream signals to the OLT 20.1 and a receiver 20.22 for detecting downstream signals from the OLT 20.1 via the sub-signals from splitter 20.61. Typically, the upstream signals are digital signals transmitted in a burst mode and in a well-known TDMA protocol.

In a GPON compatible with current ITU standards (G.984.3 and G.984.6) the downstream signal is approximately a 2.488 Gb/s digital signal transmitted at wavelength in the range of 1480-1500 nm, and the upstream signal can be either approximately a 1.244 Gb/s or a 2.488 Gb/s digital signal transmitted at a wavelength in the range of 1300-1320 nm. Illustratively, the downstream signal wavelength is approximately 1490 nm, and the upstream signal wavelength is approximately 1310 nm.

Although the following description focuses on PONs compatible with the above ITU standards, those skilled in the art will readily appreciate that my invention is also suitable for use in other PON applications including, for example, Ethernet PONs (EPONs) defined in IEEE 802.3ah (also known as "Ethernet in the First Mile") as well as in other architectures utilizing other optical signal wavelengths, such as digital or analog signals around the 1550 nm wavelength band.

Reach-Extended PON

My network design extends the reach, or increases the split ratio, or both, of a PON by incorporating remotely pumped, distributed Raman amplification. For example, as also shown in FIG. 2, the transmission fiber 20.5 exhibits Raman amplification for both of the signal wavelengths when suitably pumped from a remote location. By the word remote I mean that all Raman pump sources, which require electrical power to operate, are located outside the passive ODN 20.4, which as a practical matter currently means they are located at the CO. To this end, network 20 illustratively is a dual-pump design; that is, OLT 20.1 includes two Raman pump sources 20.14 and 20.15. Source 20.15 generates pump light $P_{CO}$ that Raman amplifies downstream signal $S_{DN}$, whereas source 20.14 generates pump light $P_{CNTR}$ that Raman amplifies upstream signals $S_{UP}$. Since pump light $P_{CO}$ and $P_{CNTR}$ both propagate downstream, pump light $P_{CNTR}$ counter-propagates relative to upstream signals $S_{UP}$, and pump light $P_{CO}$ co-propagates with downstream signal $S_{DN}$.

Alternatively, network 20 may utilize a single-pump design; that is, OLT 20.1 may retain Raman pump source 20.14 ($P_{CNTR}$) for amplifying the upstream signals, but omit the Raman pump source 20.15 ($P_{CO}$). Conversely, OLT 20.1 may retain Raman pump source 20.15 ($P_{CO}$) for amplifying the downstream signal, but omit the Raman pump source 20.14 ($P_{CNTR}$). Of the two single-pump designs, retaining the Raman pump for the upstream signals would be preferred. In either case, however, the signal that is not Raman amplified could be amplified in a conventional manner using, for example, a well known discrete amplifier such as a fiber amplifier. Since discrete amplifiers of this type also require electrical power to operate, it would typically be located in the CO/OLT 20.1.

Figure 3:
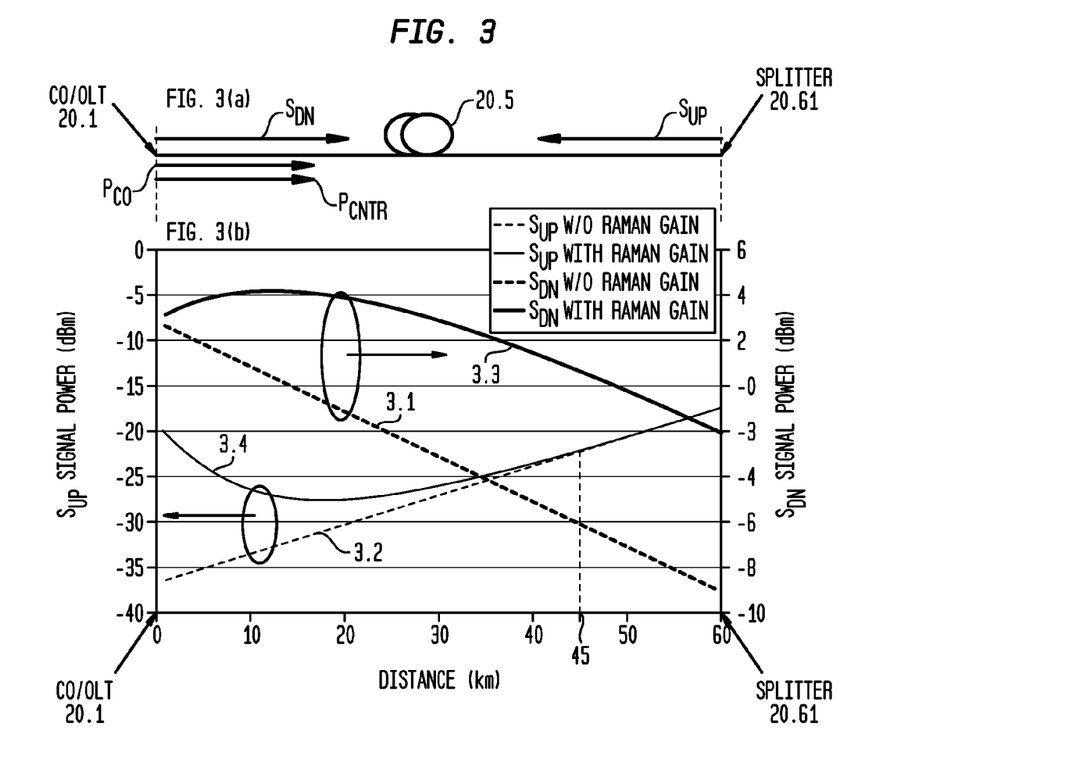
Figure 4:
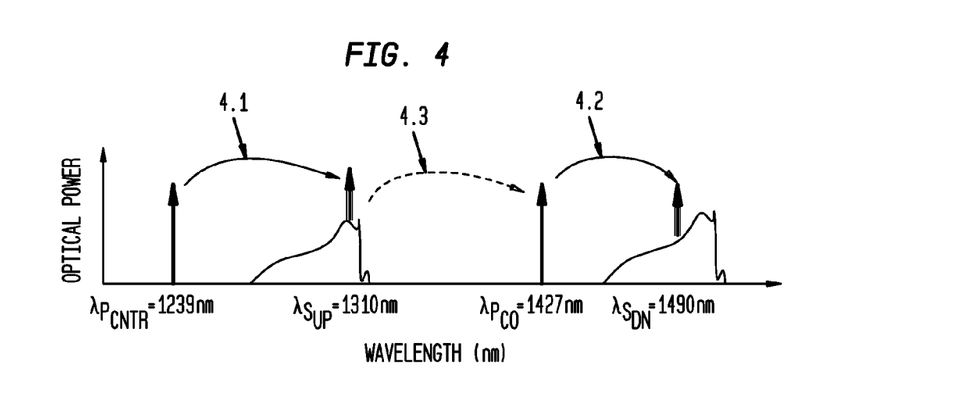
FIG. 4 is a schematic graph showing the location in the wavelength spectrum of the signals ($S_{DN}$, $S_{UP}$) and the pump light ($P_{CO}$, $P_{CNTR}$) of FIG. 2. Arrows 4.1 and 4.2 indicate that Raman amplification transfers optical power from pump light $P_{CO}$ and $P_{CNTR}$ to signals $S_{DN}$ and $S_{UP}$, respectively. In contrast, arrow 4.3 indicates that unwanted signal-to-pump interaction (known as depletion) transfers optical power from signal $S_{UP}$ to pump light $P_{CO}$.

In a dual-pump design, the propagation directions and illustrative wavelength assignments of $S_{DN}$, $S_{UP}$, $P_{CO}$ and $P_{CNTR}$ are illustrated in FIG. 3(a) and FIG. 4, respectively. More specifically, $S_{DN}$ has a wavelength of 1490 nm and propagates downstream; $S_{UP}$ has a wavelength of 1310 nm and propagates upstream; $P_{CO}$ has a wavelength of 1427 nm and co-propagates with, and Raman amplifies, downstream signal $S_{DN}$; and $P_{CNTR}$ has a wavelength of 1239 nm and counter-propagates with, and Raman amplifies, upstream signals $S_{UP}$.

Transmission fiber 20.5 is typically made of silica and has the property that it is capable of providing Raman gain/amplification over its entire length if suitably pumped. Whether or not Raman gain/amplification of a signal is in fact realized at any point along the fiber depends on the intensity/power of the pump light and the loss of the fiber, as is well known in the art. Preferably, although not necessarily, the fiber exhibits gain/amplification over its entire length. More specifically, FIG. 3(b) illustrates how the optical power of the signals $S_{DN}$ and $S_{UP}$ evolves as they propagate in the fiber 20.5. Two cases are illustrated: (i) optical power evolution of $S_{DN}$ and $S_{UP}$ as they propagate without Raman amplification. Lines 3.1 and 3.2 show that $S_{DN}$ and $S_{UP}$, respectively; attenuate due to fiber loss as they propagate in opposite directions in fiber 20.5; and (ii) optical power evolution of $S_{DN}$ and $S_{UP}$ as they propagate with Raman amplification. Curves 3.3 and 3.4 show that $S_{DN}$ and $S_{UP}$ are amplified as they propagate in fiber 20.5. In particular, $S_{DN}$ exhibits amplification over the entire length of the fiber from the CO/OLT 20.1 to the splitter 20.61. Thus, the co-propagating pump $P_{CO}$ compensates for fiber losses over the entire length of the fiber. In contrast, $S_{UP}$ exhibits significant amplification only after it has propagated about 15 km (from 60 km to 45 km in the upstream direction). Thus, counter-propagating pump $P_{CNTR}$ compensates for fiber losses over an extended length (from 45 km to 0 km, or about 75%) of the fiber length. However, other substantial fractions, both greater than and less than 75%, are still considered to be extended lengths in accordance with my invention.

The length over which distributed Raman amplification occurs for signal $S_{UP}$ can be increased using second-order Raman pumping, which is well known in the art. [See, for example, A. J. Stentz, et al., U.S. Pat. No. 6,163,636 (2000), which is incorporated herein by reference.] That is, the wavelength of $P_{CNTR}$ can be chosen to be two Stokes shifts away from the wavelength of signal $S_{UP}$, rather than one Stokes shift away, as discussed below.

In designing the wavelengths of the pump sources 20.14 and 20.15, care should be exercised in two regards. First, each pump source should generate pump light at a wavelength that provides maximum Raman gain efficiency of the signal it is designed to Raman amplify. Raman gain arises from transfer of optical power from one optical beam to another that is downshifted in frequency. The Raman gain bandwidth is over 40 THz wide with the dominant peak being near 13.2 THz. [See, M. N. Islam, Raman Amplifiers for Telecommunications 2, Springer-Verlag, New York, Inc, (2004), Ed. M. N. Islam, Ch. 1, p. 2 and Ch. 19, which are incorporated herein by reference.] In terms of wavelength, for maximum Raman gain efficiency 13.2 THz (also known as the Stokes shift) corresponds to approximately 70 nm for the $S_{UP}$ wavelength band of 1300-1320 nm (i.e., $P_{CNTR}$ should have a wavelength of about 1230-1250 nm) and about 90 nm for the $S_{DN}$ band of 1480-1500 nm (i.e., $P_{CO}$ should have a wavelength of about 1390-1410 nm, if gain efficiency were the only parameter to be considered). However, for second-order pumping, $P_{CNTR}$ would be downshifted by an additional 13.2 THz. Second, the pump light wavelengths should be designed to reduce unwanted pump-to-signal interactions; that is, the pump light for one signal should not significantly deplete the other signal. In particular, the pump light $P_{CO}$ should not significantly deplete signal $S_{UP}$. Thus, even though pump light at $\lambda_{PCO}$=1400 nm would provide nearly optimum gain for signal $S_{DN}$, it would cause an unacceptable amount of depletion (arrow 4.3, FIG. 4) of signal $S_{UP}$. On the other hand, I have found that $\lambda_{PCO}$=1427 nm provides adequate gain for signal $S_{DN}$ and significantly reduces depletion of signal $S_{UP}$ as described in the Example section, infra. Illustratively, as shown in FIG. 4, $\lambda_{PCNTR}$=1239 nm $<\lambda_{SUP}$=1310 nm; and $\lambda_{PCO}$=1427 nm $<\lambda_{SDN}$=1490 nm. More generally, however, a suitable range of pump light wavelengths is approximately 1230-1250 nm for $\lambda_{PCNTR}$ and 1415-1435 nm for $\lambda_{PCO}$.

How much gain depletion of upstream signals $S_{UP}$ is significant depends on system performance parameters such as the BER associated with that signal. For a given optical power of an upstream signal as launched at the ONU/ONT 20.2, parameters such as BER are, in turn, impacted by other operating parameters, such as the wavelength of the co-propagating pump light and the power of the counter-propagating pump light. Thus, consider FIG. 9, which depicts the evolution of optical power of an upstream signal between the CO/OLT 20.1 and the ONU/ONT 20.2. Line 9.5 shows the minimum (or threshold) power of the upstream signal at the OLT 20.1 for "error-free" operation, as that term is understood in the industry (i.e., a BER of less than $10^{-12}$). Several cases are illustrated: (i) Line 9.1 represents a conventional PON having no distributed Raman amplification and a reach of $L_0$. For this network the upstream signal achieves error-free operation (as indicated by point 9.11, which lies on the threshold line 9.5), but only for a relatively short span (reach); (ii) Line 9.2 represents another conventional PON again having no distributed Raman amplification but a longer reach of $L_{EXT}$. For this network the upstream signal fails to achieve error-free operation (as indicated by point 9.21, which lies below the threshold line 9.5); (iii) Curve 9.3 represents the extended-reach ($L_{EXT}$) PON of (ii) above modified to provide distributed Raman amplification in accordance with an illustrative embodiment of my invention. The upswing in optical power at distances approaching the OLT 20.1 indicates the positive effect of distributed Raman amplification of the upstream signal. The Raman on-off gain is indicated at 9.6, and error-free operation is indicated by point 9.31, which lies above the threshold 9.5; and (iv) Curve 9.4 represents the PON of (iii) above in which the received power of the upstream signal at the OLT 20.1 (as indicated by point 9.41, which lies below threshold 9.5) is insufficient for error-free operation. For a given optical power of the upstream signal as launched from the ONU/ONT 20.2 (point 9.8), and a given optical power of the counter-propagating pump light, the difference 9.7 in received power of the upstream signal at the OLT 20.1 (point 9.41) represents power lost as a result of depletion of the upstream signal $S_{UP}$ by the co-propagating pump light. To not be significant, this loss in power should not cause point 9.41 to fall below the threshold 9.5. In general, therefore, to be acceptable any depletion of $S_{UP}$ caused by the co-propagating pump light $P_{CO}$ should not prevent "error-free" operation; that is, the depletion level should allow the BER of the upstream signal to be less than $10^{-12}$.

Figure 9:
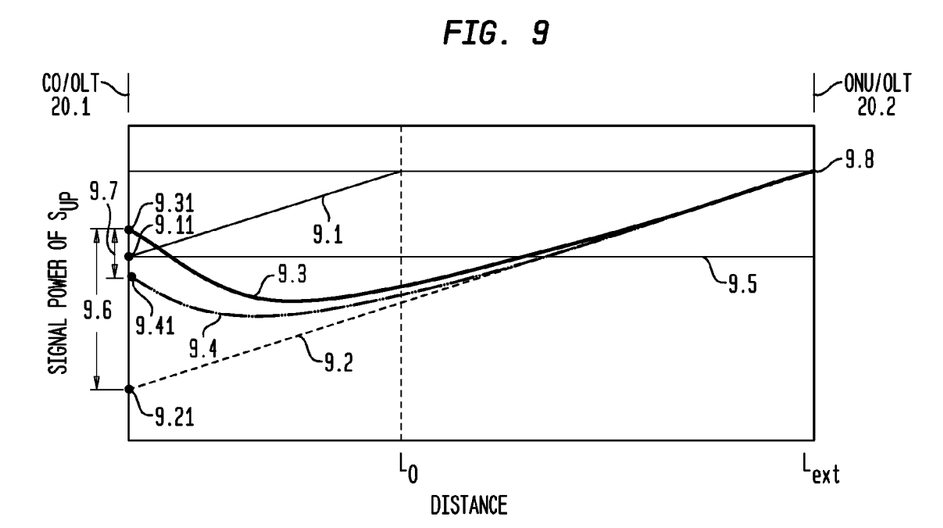
FIG. 9 is graph showing the evolution of power of the upstream signal comparing conventional networks (lines 9.1 and 9.2) with networks in accordance with an illustrative embodiment of my invention (curves 9.3 and 9.4, the latter demonstrating the adverse effect of significant depletion of the upstream signal by the co-propagating pump light).

The foregoing discussion of FIG. 9 shows the impact of extended reach on the received optical power of the upstream signal. But, it would be apparent to one skilled in the art that increased split ratio would have a similar impact since reach and split ratio affect the power budget of the network in a similar fashion.

In addition, in an optical fiber transmission line with distributed Raman amplification, such as fiber 20.5, it is well known that co-propagation of signal $S_{DN}$ and pump light $P_{CO}$ may lead to unwanted degradation of $S_{DN}$ if the relative intensity noise (RIN) of the pump light $P_{CO}$ is too high. In essence, fluctuations in the pump light intensity with time can be impressed onto the co-propagating signal (a form of crosstalk), thereby increasing the signal noise level.

This effect is absent if the signal and pump light counter-propagate (as with signal $S_{UP}$ and pump light $P_{CNTR}$) because the pump light intensity is effectively averaged along the fiber path. To prevent such pump-signal cross-talk from causing significant signal degradation, it is desirable for the RIN of the co-propagating pump light source be less than approximately $-120$ dB/Hz (e.g., $-150$ dB/Hz) when the frequency of the pump light intensity fluctuations is in the range of approximately 1-100 MHz.

De-polarization of the co-propagating pump light $P_{CO}$ is another design consideration because the polarization-dependent gain (PDG) of Raman amplification is sensitive to the degree of polarization (DOP) of the pump light. It is desirable for the DOP to be less than 10% for the co-propagating pump light. For counter-propagating pump light $P_{CNTR}$, however, it is not necessary to use a low DOP pump source because fluctuations in polarization are effectively averaged over the signal path when pump and signal counter-propagate, making counter-pumped Raman amplification immune to PDG. Co-propagating pump light can be depolarized by using two polarization-multiplexed laser diodes or by using depolarizes fiber devices, both of which are well known in the art and commercially available.

As depicted in FIG. 2, RN 20.6 also includes a wavelength sensitive component 20.62 coupled between its own input port 20.63 and the input port 20.64 of splitter 20.61. In one embodiment, component 20.62 comprises a bandpass filter, which serves to filter out pump light ($P_{CO}$ and $P_{CNTR}$) so that it does not become a significant source of noise in downstream receiver 20.22. Alternatively, and preferably, component 20.62 comprises a fiber reflector, such as a pair of cascaded (or tandem) fiber Bragg gratings (FBGs), which serve to reflect residual pump light; that is, pump light that is not absorbed in the Raman process during the first pass through the transmission fiber 20.5. Illustratively, more than 90% of the residual $P_{CO}$ and $P_{CNTR}$ is reflected in this manner. The reflected pump light propagates back into the fiber so that it can provide additional gain to the signals, thereby increasing the Raman amplification efficiency and lowering noise due to double Rayleigh scattering in the fiber. Of course, the degree to which such efficiency is enhanced depends on the residual pump power; that is, it depends on how much pump power is launched from the CO/OLT and how much the pump light is attenuated in propagating from the CO/OLT to the RN.

Like the bandpass filter, the reflectors also serve to prevent a significant amount of pump light from reaching receivers 20.22 where it would be a significant source of noise.

In both embodiments described above (bandpass filter or reflector) the amount of pump light that is significant (i.e., that can be tolerated in receiver 20.22) depends on the specified OSNR and BER. Illustratively, however, the filter or reflector prevents at least about 45 dB of the pump light power from reaching the receiver.

The individual components/devices depicted in FIG. 2 in schematic form are typically well-known in the art and/or commercially available. For example:

(1) Signal Sources/Detectors: In addition to conventional electronic circuitry, transmitters 20.11 and 20.21 typically include distributed feedback (DFB) semiconductor laser diodes (LDs) for generating signals $S_{DN}$ and $S_{UP}$, respectively, and receivers 20.12 and 20.22 typically include avalanche photodiodes (APDs) or PIN photodiodes for detecting signals $S_{UP}$ and $S_{DN}$, respectively. Other types of lasers and detectors, however, may also be suitable. In addition, in many optical systems, including PONs, the transmitters and receivers are typically configured as transceivers.

(2) Pump Sources: On the other hand, the type of pump light sources 20.14, 20.15 utilized depends on the pump wavelength needed for Raman amplification of signals $S_{DN}$ and $S_{UP}$. Thus, if $S_{DN}$ and $S_{UP}$ have ITU (G. 984)-compatible wavelengths of 1490 nm and 1310 nm, respectively, then suitable wavelengths $\lambda P_{CO}$ and $\lambda P_{CNTR}$ would be 1427 nm and 1239 nm, respectively, as mentioned earlier. Under these circumstances, the pump source 20.14 of 1239 nm pump light is illustratively a well-known cascaded Raman laser of the type described by S. Grubb in U.S. Pat. No. 5,323,404 (1994), which is incorporated herein by reference. Alternatively pump source 20.14 may be a commercially available semiconductor laser diode. Likewise, pump source 20.15 of 1427 nm pump light $P_{CO}$ is also illustratively a commercially available semiconductor laser diode.

More specifically, the pump light $P_{CNTR}$ at 1239 nm is designed to have maximum Raman on-off gain efficiency for upstream signals $S_{UP}$ at 1310 nm, but $P_{CNTR}$ does not provide amplification for the down-stream signal $S_{DN}$ at 1490 nm because its wavelength is far away from the Raman gain band for $S_{DN}$, as shown in FIG. 4. In any case and whatever its design, each pump laser is preferably capable of delivering approximately 500 mW to 1 W of optical power into transmission fiber 20.5. The deliverable power is determined by the physical layer characteristics of the system; e.g., the characteristics of the transmission fiber, the reach of PON, and the losses in various optical components such as optical splitters, WDM combiners etc.

Figure 5:
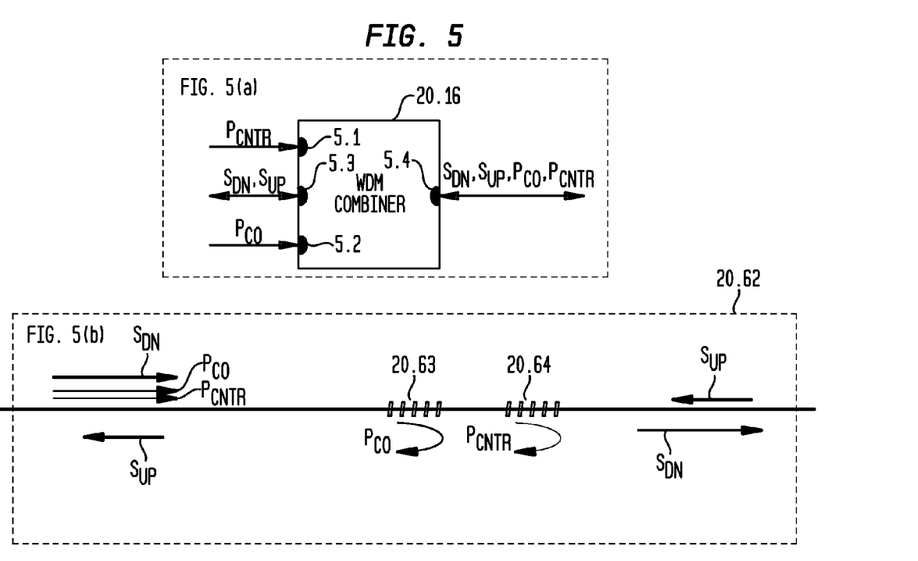
FIG. 5(a) shows a schematic block diagram of WDM combiner 20.16 of FIG. 2 indicating how $S_{DN}$, $S_{UP}$, $P_{CO}$ and $P_{CNTR}$ are associated with the various ports of the combiner.
FIG. 5(b) is schematic diagram of wavelength-sensitive component 20.62 of FIG. 2 comprising a pair of fiber Bragg gratings 20.63 and 20.64.

(3) Combiner: A suitable WDM combiner 20.16 is included in the OLT 20.1 for coupling the different wavelength signals and pump light (downstream $S_{DN}$, $P_{CO}$, $P_{CNTR}$; upstream $S_{UP}$) to/from the transmission fiber. FIG. 5(a) illustrates the port assignments for the combiner: input ports 5.1 and 5.2 for $P_{CO}$ and $P_{CNTR}$, respectively; input/output port 5.3 for $S_{DN}$ and $S_{UP}$; and input/output port 5.4 for $S_{DN}$, $S_{UP}$, $P_{CO}$ and $P_{CNTR}$. Such a combiner, which may be fabricated using well-known thin-film technology, is available from commercial suppliers.

Whatever technology is used, however, combiner 20.16 should be a low optical loss device and should provide high isolation (e.g., >40 dB) between the signals $S_{DN}$, $S_{UP}$ and the pump light $P_{CO}$, $P_{CNTR}$.

(4) Couplers: Note that each transmitter/receiver pair is coupled to a single fiber via a conventional coupler/splitter. For example, the transmitter/receiver pair 20.11/20.12 of OLT 20.1 is coupled to combiner 20.16 (and hence transmission fiber 20.5) via coupler/splitter 20.13, whereas the transmitter/receiver pair 20.21/20.22 of ONU/ONT 64 is coupled to drop line (or fan-out) fiber 20.9 (and hence remote node 20.6) via coupler/splitter 20.23. Alternatively, other well-known devices, such as circulators, may be used instead of the couplers and splitters described above.

(5) Fiber: The fiber 20.5 providing the optical link between the CO/OLT and the ONU/ONTs may be any standard transmission fiber. Preferably, however, this fiber should have relatively low optical loss around the signal wavelengths and in particular around 1385 nm, which corresponds to the well-known wavelength of peak absorption due to the presence of water or OH ions in the fiber. To this end, Zero Water Peak AllWave® fiber manufactured by OFS Fitel, LLC, Norcross, GA, is preferred, although low water peak fiber is also acceptable.

(6) Filter/Reflector: When frequency sensitive component 20.62 is a pump reflector, it is typically a cascaded Bragg grating (CBG) device as depicted in FIG. 5(b). Here, a first CBG 20.63 reflects pump light $P_{CO}$ but transmits signals $S_{DN}$ and $S_{UP}$ and transmits pump light $P_{CNTR}$. Similarly, a second CBG 20.64, which is located downstream of CBG 20.63, reflects $P_{CNTR}$ and also transmits $S_{DN}$ and $S_{UP}$. In order for these cascaded reflectors to reflect residual pump light back into the transmission fiber for further amplification of the signals and, in addition, to prevent pump light from entering the receivers at ONU/ONTs, they should have low loss at the signal wavelengths (e.g., 1310 nm and 1490 nm), high reflection (>45 dB) at pump wavelengths (e.g., 1240 nm and 1427 nm), and adequate bandwidth (greater than approximately 2 nm to 4 nm). Cascaded Bragg grating devices are described by D. J. DiGiovanni et al., U.S. Pat. No. 6,504,973 (2003) and by M. N. Islam, ibid., Ch. 1, pp. 1-33, both of which is are incorporated herein by reference.

A significant advantage of my invention resides in its ability to provide outside-plant (or ODN) amplification without requiring outside-plant electrical power to do so. Thus, the outside plant does not locally power the amplification process in the transmission fiber; rather, pump laser sources in the CO/OLT remotely power a Raman amplification process, which is distributed over at least an extended length of the transmission fiber.

In particular, a remotely-pumped PON in accordance with one aspect of my invention increases the reach and/or split ratio (or both) of the optical network, thereby providing several specific advantages: (1) node consolidation, which allows OLTs to be located in a reduced number of COs and thereby leads to cost savings in real state, operations and powering; (2) Greenfield deployments; that is, extending service to CPs located in areas (e.g., rural areas) where there are currently few access networks, or perhaps none at all. Such CPs are often located relatively long distances from existing COs, potentially beyond the reach of existing PONs. Thus, my invention allows high speed data services (e.g., Internet), as well as voice and video services, to be provided to CPs in rural areas by extending the transmission distance without having to build a new CO or having to provide electrical power for a conventional optical amplifier box as described in the prior art. See, for example, K. Suzuki et al., supra, and P. P. Iannone et al., supra; and (3) increased flexibility in PON deployments. In a conventional PON deployment, for longer distances, the PON loss budget may not allow operators (telecommunication service providers) to deploy as high a split ratio as they would like on shorter system spans (or reaches). By using a PON with remotely-pumped distributed Raman amplification in accordance with my invention, the operator has the opportunity to deliver the same split ratios in longer reach PONs as they currently can deliver for only shorter reach PONs. For example, FIG. 1 illustrates a prior art PON capable of a maximum reach of only 20 km with a split ratio of 1:32. Since reach and split ratio can be traded off to some extent, a higher split ratio of, say, 1:64 is possible only if reach is sacrificed (e.g., reduced to 10 km). In contrast, PONs in accordance with my invention are capable of reaches up to 60 km with split ratios as high as 1:64. In applications where a shorter reach (e.g., 40 km) can be tolerated, my PON is capable of even higher split ratios (e.g., 1:128).

As mentioned previously, in some situations, the optical power of the downstream signal $S_{DN}$ may be sufficiently high that distributed Raman amplification of that signal is not necessary. This situation could arise, for example, when downstream signal transmitter 20.11 can deliver high output power or can be amplified to high power before launching $S_{DN}$ into transmission fiber 20.5. In such situations, second pump source 20.15 for generating $P_{CO}$ may be omitted.

EXAMPLE

This example demonstrates a reach-extended, remotely-pumped, distributed Raman gain GPON, which provided symmetric 2.488 Gb/s transmission over 60 km of fiber. The network was compatible with ITU G.984. Various materials, dimensions and operating conditions are described by way of illustration only and, unless otherwise expressly stated, are not intended to limit the scope of the invention.

FIG. 2 is a schematic diagram of the experimental apparatus, showing a CO/OLT 20.1 optically coupled to a RN 20.6 by means of 60 km of Zero Water Peak AllWave® single-mode optical fiber 20.5 and a multiplicity of ONU/ONTs 20.2. The OLT comprised (i) a transmitter 20.11 including a DFB LD for generating a downstream optical signal at 1490 nm, (ii) a receiver 20.12 including an APD for detecting upstream optical signals at 1310 nm, (iii) a WDM combiner 20.16, and (iv) Raman pump sources 20.14 and 20.15 that provided remote pumping of distributed Raman gain in fiber 20.5. In particular, pump source 20.14 generated downstream, counter-propagating pump light at 1239 nm for amplifying the upstream signals at 1310 nm, and pump source 20.15 generated downstream, co-propagating pump light at 1427 nm for amplifying the downstream signal at 1490 nm.

Each ONU/ONT comprised (i) a transmitter 20.21 including a DFB LD for generating Upstream signals at 1310 nm and (ii) a receiver 20.22 including an APD for detecting downstream signals at 1490 nm.

The RN 20.6 included only passive optical components: a 1:64 optical splitter 20.61 and a band pass filter (BPF) 20.62. The BPF was used to filter out the residual pump light, thereby preventing any significant amount of pump light from entering the 1490 nm receivers 20.22 at the ONU/ONTs. The amount of pump light power transmitted through the filter was at least about 45 dB lower than the amount of pump light power that was blocked by the filter.

The 1239 nm pump light was generated in a cascaded Raman fiber laser. Semiconductor laser diodes at 915 nm were used to pump a Yb-doped, cladding-pumped fiber laser whose output at 1117 nm was inputted to a cascaded Raman resonator (CRR). The CCR comprised a Raman fiber and a cascaded grating set to shift the output wavelength up to 1239 nm. The residual Raman shifted wavelength at 1172 nm was more than 20 dB below the 1239 m wavelength and did not contribute significantly to the Raman gain.

The co-propagating pump light at 1427 nm, which provided gain for the 1490 nm downstream signal, was substantially depolarized. In particular, it was generated by two, polarization multiplexed 1427 nm LDs with DOP <5% and low RIN <−150 dB/Hz. Pump light near 1400 nm would have provided the maximum Raman gain efficiency for the 1490 nm signal, but the upstream 1310 nm signal would have been significantly depleted in this case. An important trade-off was made by designing the Raman pump for the downstream signal to have a wavelength of 1427 nm to reduce depletion at 1310 nm while providing enough gain at 1490 nm.

The 1490 nm LDs located at the OLT 20.1 and the 1310 nm LDs located at the ONU/ONTs 20.2 were commercially available, un-cooled DFBs with 3 dBm output power.

The measured fiber losses at 1310 nm and 1490 nm were 0.317 dB/km and 0.21 dB/km, respectively. The 64-way splitter loss was 20 dB, and the total loss of the WDM combiner, connectors and BPF was 4.0 dB. Hence, the total link loss budgets between OLT and ONU/ONT were 43.0 and 36.6 dB for the upstream 1310 nm signals and downstream 1490 nm signals, respectively.

Figure 6:
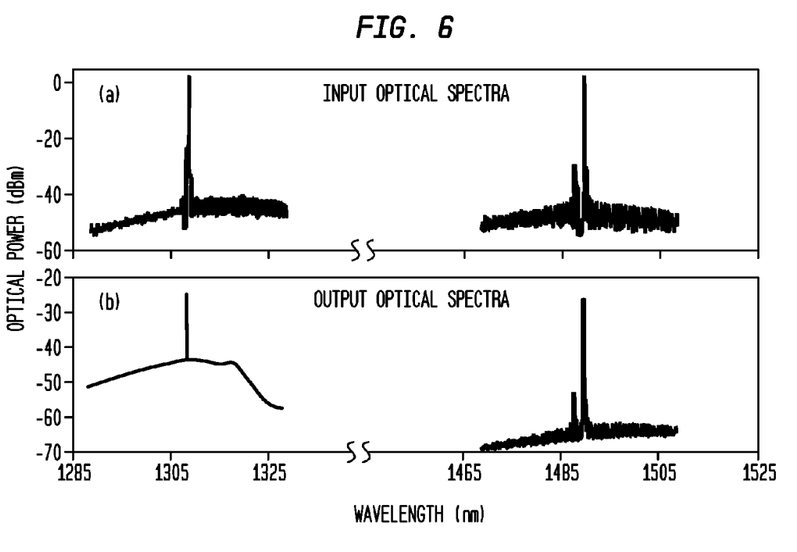
FIG. 6 shows graphs of the input spectra [FIG. 6(a)] and output spectra [FIG. 6(b)] for both the upstream signal (1310 nm) and downstream signal (1490 nm) of FIG. 2.

As measured at the output of the CO/OLT, the 1427 nm pump light provided 7 dB of on-off Raman gain to the 1490 nm downstream signal for a power of 370 mW at the input to the fiber. As shown in FIG. 7(b), there was minimal degradation of OSNR for the 1490 nm signals because of the relatively high input signal power in the co-propagating pump configuration. Conversely, the OSNR of the 1310 nm signals was degraded [FIG. 6(b)] due the low input signal power into the transmission fiber in the counter-propagating pump configuration. (The power of the upstream 1310 nm signal from the ONU/ONT was decreased by the 20 dB loss it experienced in passing through the splitter before it was coupled into the fiber.) Additionally, the 1310 run signals were slightly depleted by the 1427 nm pump light (although depletion would have been worse with 1400 nm pump light).

One technique to improve the OSNR of the upstream 1310 nm signal would be to use second-order Raman pumping, as mentioned previously. In particular, in addition to using pump source 20.14 of counter-propagating pump light at 1239 nm, another source (not shown) of pump light at a wavelength one Stokes shift lower, around 1160-1180 nm (e.g., 1172 nm), would also be coupled through WDM combiner 20.16 into fiber 20.5. Light at 1172 nm would provide distributed Raman amplification to the 1239 nm light, which in turn would provide distributed Raman amplification of the 1310 nm signal. Advantageously, the amplified 1239 nm pump light would penetrate deeper into the fiber length, which would thereby improve OSNR of the 1310 nm signal at receiver 20.12. Second order Raman pumping, however, was not used in the network described in this "Example" section.

Figure 7:
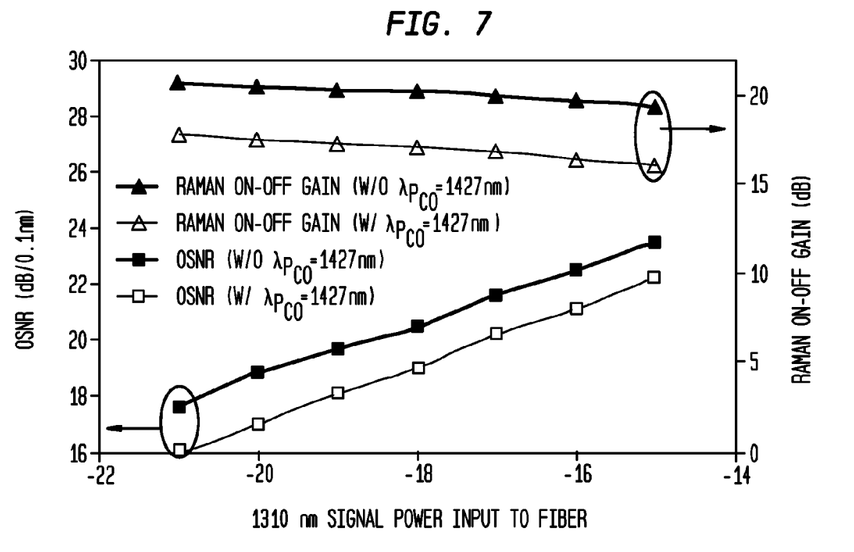
FIG. 7 is a graph showing Raman on-off gains and optical signal-to-noise ratios (OSNRs) for 1310 nm upstream signals without 1427 nm pump light, and alternately with 1427 nm pump light, in the transmission fiber of FIG. 2.

FIG. 7 shows the Raman on-off gain and OSNR of the 1310 nm signals as a function of input power to the fiber with 980 mW of pump power at 1239 nm. The gain of the 1310 nm signals dropped by 3.5 dB with the 1427 nm pump light on, which reflects the depletion phenomenon discussed previously in conjunction with FIG. 4 (arrow 4.3). The resulting OSNR decreased by 2 dB. The on-off Raman gain for the 1310 nm upstream signal was 16.5 dB, and the OSNR was about 19 dB at a resolution bandwidth of 0.1 nm.

Figure 8:
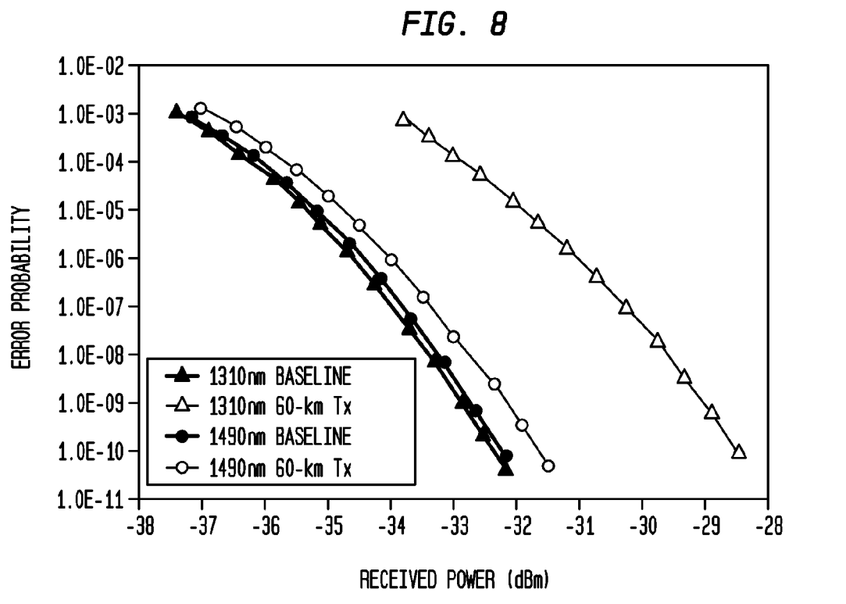
FIG. 8 is a graph showing bit-error-rate (BER) performance of a reach-extended embodiment of the PON of FIG. 2. In the inset, the phrase "60-km Tx" means that the corresponding curves represent BER measured after the signal propagates through a 60-km-long transmission fiber 20.5, and the word "baseline" means that the corresponding curves represent BER measured without the 60 km fiber [i.e., the CO/OLT and splitter were coupled to one another by a short (e.g., 2 m) fiber jumper]

The DFB LDs, which generated the signals at 1310 nm and 1490 nm, were directly modulated at 2.488 Gb/s ($2^{31}-1$ PRBS). As noted earlier, these signals were detected by APDs in the corresponding receivers. FIG. 8 shows the BER performance for upstream and downstream signals with both channels operating through the system simultaneously. There was only about 0.6 dB power penalty for the 1490 nm downstream signal after 60 km transmission with total link loss of 36.6 dB. In theory, the power penalty may have been caused by chromatic dispersion at 1490 nm. The upstream BER performance was degraded by as much as 3.6 dB relative to the baseline due to added noise in the distributed Raman amplification process. However, there was no indication of error floors, and "error-free" bidirectional transmission over 60 km fiber with 1:64 split for 1310 and 1490 nm signals was achieved at 2.488 Gb/s. The lack of an error floor indicates that my GPON is capable of a BER of less than $10^{-12}$.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, although the experimental apparatus described above demonstrated only continuous mode upstream BER performance, I do not expect the performance with burst-mode upstream signals would suffer (e.g., any transient effects) due to the Raman amplification. In addition, I expect improved pumping efficiency with the use of a lower loss WDM combiner at the OLT.

It will also be apparent from the foregoing description that another aspect of my invention is a method of extending the reach or increasing the split ratio, or both, of a bidirectional optical communications network 20 (FIG. 2) including a first terminal 20.1 coupled to one end of an optical communications fiber 20.5 that exhibits distributed Raman gain over at least an extended portion of its length and a multiplicity of second terminals 20.2 coupled to another end of the fiber. The method comprises the steps of:

(a) generating at the first terminal 20.1 a downstream optical signal $S_{DN}$ at a first Wavelength (e.g., 1490 nm), (b) detecting at the first terminal 20.1 upstream optical signals $S_{UP}$ at a second wavelength (e.g., 1310 nm), (c) generating at the first terminal 20.1 pump light that provides Raman amplification to either the upstream signals $S_{UP}$ or the downstream signal $S_{DN}$, or both, and (d) generating at each of the second terminals 20.2 the upstream signals $S_{UP}$ at the second wavelength, (e) detecting at each of the second terminals 20.2 the downstream signal $S_{DN}$, and (f) passively (i) splitting the downstream signal $S_{DN}$ into a multiplicity of downstream sub-signals, wherein each downstream sub-signal propagates at the first wavelength to a separate one of the second terminals (e.g., ONU/ONT) and (ii) combining each of the upstream signals $S_{UP}$ from each of the second terminals 20.2 onto the fiber 20.5 for transmission to the first terminal 20.1.

In one embodiment of the foregoing method, step (c) generates pump light $P_{CNTR}$ (e.g., at a wavelength of 1239 nm) that counter-propagates with and provides Raman amplification to the upstream signals $S_{UP}$. In another embodiment of the foregoing method, step (c) also generates pump light $P_{CO}$ (e.g., at a wavelength of 1427 nm) that co-propagates with and Provides Raman amplification to the downstream signal $S_{DN}$.

Another embodiment of the foregoing method includes that additional step of, after the pump light has propagated in one direction (e.g., downstream) through the fiber, reflecting residual pump light for propagation in the opposite direction (e.g., upstream), thereby to provide additional Raman amplification of either or both of the signals $S_{DN}$ and $S_{UP}$.

An alternative embodiment of the foregoing method includes the additional step of filtering the pump light so that it does not introduce significant noise in the receivers of the second terminals.

Another alternative embodiment of the foregoing method includes the step of generating the pump light $P_{CO}$ at a wavelength that does not significantly deplete the upstream signal $S_{UP}$.

In one more embodiment of the foregoing method, the wavelength of the co-propagating pump light is selected to avoid significant depletion of the upstream signals, which, in turn, means that the wavelength of the co-propagating pump light is selected so that the upstream signal has a BER of less than $10^{-12}$.

Finally, in yet another embodiment of the foregoing method the steps are configured so that the distance between the first and second terminals (i.e., the reach) can be as long as approximately 60 km (to the farthest of the second terminals) when the multiplicity of step (f) (i.e., the split ratio) is as high as 128.

I claim:

1. A bidirectional optical communications network comprising:
    an optical transmission fiber for carrying a downstream signal at a first wavelength and a multiplicity of upstream signals at a second, different wavelength, said fiber being characterized by distributed Raman gain over at least an extended portion of the length of said optical fiber,
    a first terminal optically coupled to an upstream end of said fiber, said first terminal comprising:
        a first transmitter for generating said downstream signal,
        a first receiver for detecting said upstream signals, and
        at least two pump sources comprising a first pump source for generating pump light that counter-propagates with and provides Raman amplification to said upstream signals and a second pump source for generating pump light that co-propagates with and provides Raman amplification to said downstream signal,
    a multiplicity of second terminals optically coupled to a downstream end of said fiber, each of said second terminals comprising:
        a second transmitter for generating one of said upstream signals, and
        a second receiver for detecting a downstream sub-signal, and
    a passive optical node (i) for splitting said downstream signal into a multiplicity of said downstream sub-signals, wherein each downstream sub-signal propagates at said first wavelength to a separate one of said second terminals and (ii) for combining each of said upstream signals from each of said second terminals onto said fiber for transmission to said first terminal,
    wherein said downstream signal first wavelength is within the range of approximately 1480-1500 nm, said upstream signal second wavelength is within the range of approximately 1300-1320 nm, said co-propagating pump light has a wavelength within the range of approximately 1415-1435 nm, and said counter-propagating pump light has a wavelength within the range of approximately 1230-1250 mn, the wavelengths of said upstream signal and said co-propagating pump light being chosen so as to reduce depletion of the gain of said upstream signal, and
    wherein said node further comprises a bandpass filter for filtering out said pump light after it propagates through said fiber, so as to reduce the amount of pump light that enters said second receivers.

2. The network of claim 1 wherein said co-propagating pump light has intensity fluctuations characterized by a RIN<−120 dB/Hz when said fluctuations are in a frequency range of approximately 1-100 MHz.

3. The network of claim 1, wherein said co-propagating pump light is substantially de-polarized such that its degree of polarization is less than approximately 10%.

4. The network of claim 1, wherein said first terminal further comprises a wavelength-division multiplexer for coupling said downstream signal and said pump light into said fiber.

5. The network of claim 1, wherein said node further includes reflectors for reflecting said pump light, thereby to provide additional Raman amplification of said signal amplified by said at least one pump source.

6. The network of claim 5, wherein said reflectors transmit said downstream signal and said upstream signals.

7. The network of claim 1, wherein said first transmitter transmits said downstream signal in a continuous mode.

8. The network of claim 1, wherein said second transmitter transmits said upstream signals in a burst mode.

9. The network of claim 8, wherein said second transmitter transmits said upstream signals using TDMA protocol.

10. The network of claim 1, wherein said second pump source is configured so that said upstream signal has a BER of less than $10^{-12}$.

11. A bidirectional optical communications network comprising:
    an optical transmission fiber for carrying a downstream signal at a first wavelength and a multiplicity of upstream signals at a second, different wavelength, said fiber being characterized by distributed Raman gain over at least an extended portion of the length of said optical fiber,
    a first terminal optically coupled to an upstream end of said fiber, said first terminal comprising:
        a first transmitter for generating said downstream signal,
        a first receiver for detecting said upstream signals, and
        at least two pump sources for generating pump light that provides Raman amplification to said upstream signals and said downstream signal;
    a multiplicity of second terminals optically coupled to a downstream end of said fiber, each of said second terminals comprising:
        a second transmitter for generating one of said upstream signals, and
        a second receiver for detecting a downstream sub-signal and
    a passive optical node (i) for splitting said downstream signal into a multiplicity of said downstream sub-signals, wherein each downstream sub-signal propagates at said first wavelength to a separate one of said second terminals and (ii) for combining each of said upstream signals from each of said second terminals onto said fiber for transmission to said first terminal,
    wherein said at least two pump sources comprises a first pump source for generating pump light that counter-propagates with and provides Raman amplification to said upstream signals, also comprises a second pump source for generating pump light that co-propagates with and provides Raman amplification to said downstream signal, and are configured so that said co-propagating pump light provides gain to said downstream signal and reduces depletion of the gain of said upstream signal,
    wherein said first signal wavelength is within the range of approximately 1480-1500 nm, said second signal wavelength is within the range of approximately 1300-1320 nm, said co-propagating pump light has a wavelength within the range of approximately 1415-1435 nm, and counter-propagating pump light has a wavelength within the range of approximately 1230-1250 nm, and
    wherein said at least one pump source comprises a third source of pump light having a wavelength within the range of approximately 1160-1180 nm, said third source being configured to provide second-order Raman amplification to said counter-propagating pump light having a wavelength within the range of approximately 1230-1250 nm.

12. The network of claim 1, wherein the distance between said first terminal and the farthest of said multiplicity of second terminals is as long as approximately 60 km when said multiplicity of second terminals is as high as 128.

13. A passive optical node for use in a bidirectional optical communications network for broadcasting a downstream optical first signal at a first wavelength from a first terminal over a transmission fiber exhibiting distributed Raman gain over at least an extended portion of its length to a multiplicity of second terminals that each transmit upstream optical second signals at a second wavelength, said first terminal further including at least one pump source for generating pump light that provides Raman amplification to either said downstream signal or said upstream signal or both, and said passive optical node comprising a passive optical device (i) for splitting said downstream signal into a multiplicity of downstream sub-signals each propagating at said first wavelength to a separate one of said second terminals and (ii) for combining each of said upstream signals from each of said second terminals onto said fiber for transmission to said first terminal, said node further including a bandpass filter for filtering out said pump light after it propagates through said fiber, so as to reduce the amount of pump light that enters said second terminals.

14. The node of claim 13, wherein said at least one source comprises a first pump source for generating pump light that co-propagates with and provides Raman amplification to said downstream signal and a second source for generating pump light that counter-propagates with and provides Raman amplification to said upstream signals.

15. The node of claim 13, wherein said pump light propagates downstream in said fiber and further including reflectors for reflecting said pump light after it has propagated through said fiber, thereby to generate upstream pump light that provides additional Raman amplification to said signal that said at least one pump source amplified.

16. The node of claim 15, wherein said reflectors transmit said downstream signal and said upstream signals.

17. A method of extending the reach or increasing the split ratio or both of a bidirectional optical communications network including a first terminal coupled to one end of an optical communications fiber that exhibits distributed Raman gain over at least an extended portion of its length and a multiplicity of second terminals coupled to another end of the fiber, the method comprising the steps of:

(a) generating at the first terminal a downstream signal at a first wavelength within the range of approximately 1480-1500 nm;

(b) detecting at the first terminal upstream signals at a second wavelength within the range of approximately 1300-1320 nm;

(c) generating at the first terminal first pump light that provides Raman amplification to said upstream signals and second pump light that provides Raman amplification to said downstream signal; wherein step (c) generates first pump light at a wavelength within the range of approximately 1230-1250 nm that counter-propagates with and provides Raman amplification to said upstream signals and generates second pump light at a wavelength within the range of approximately 1415-1435 nm that co-propagates with and provides Raman amplification to said downstream signal, wherein the wavelength of said co-propagating pump light is selected to reduce gain depletion of said upstream signals, (d) generating at said second terminals said upstream signals at said second wavelength;

(e) detecting at said second terminals downstream sub-signals, and (f) passively (i) splitting said downstream signal into a multiplicity of downstream sub-signals, wherein each downstream sub-signal propagates at said first wavelength to a separate one of said second terminals and (ii) combining each of said upstream signals from each of said second terminals onto said fiber for transmission to said first terminal, further comprising, after said pump light propagates through said fiber, the step of filtering said pump light, so as to reduce the amount of said pump light that enters said second terminals.

18. The method of claim 17, wherein the wavelength of said co-propagating pump light is selected so that said upstream signal has a BER of less than $10^{-12}$.

19. The method of claim 17, further comprising, after said pump light propagates downstream through said fiber, the step of reflecting said pump light upstream through said fiber, thereby to provide additional Raman amplification to said signal that was amplified in step (c).

20. The method of claim 17, wherein said steps are configured so that the distance between said first terminal and the farthest of said second terminals is as long as approximately 60 km when said multiplicity of second terminals is as high as 128.

* * * * *